United States Patent [19]

Ozawa et al.

[11] 4,319,283
[45] Mar. 9, 1982

[54] PORTABLE COPYING MACHINE

[75] Inventors: Takashi Ozawa; Mutsuo Takenouchi; Souichi Sekimoto; Yoshiki Kikuchi, all of Ebina, Japan

[73] Assignee: Fuji Xerox Co., Ltd., Tokyo, Japan

[21] Appl. No.: 138,960

[22] Filed: Apr. 10, 1980

[30] Foreign Application Priority Data

Apr. 17, 1979 [JP] Japan .................................. 54-45979

[51] Int. Cl.³ .......................... H04N 1/10; H04N 1/22
[52] U.S. Cl. .................................... 358/286; 358/293; 358/296
[58] Field of Search .......... 358/286, 293, 294, 296–304

[56] References Cited

U.S. PATENT DOCUMENTS

| | | | |
|---|---|---|---|
| 2,832,820 | 4/1958 | Blackstone | 358/286 |
| 3,652,793 | 3/1972 | Farr et al. | 358/286 |
| 3,662,103 | 5/1972 | Wilmer et al. | 358/286 |
| 3,707,601 | 12/1972 | Gable | 358/293 |
| 3,867,569 | 2/1975 | Watson | 358/293 |
| 4,074,324 | 2/1978 | Barrett | 358/296 |
| 4,199,784 | 4/1980 | Wellendorf | 358/296 |
| 4,245,259 | 1/1981 | Pick | 358/285 |

FOREIGN PATENT DOCUMENTS

| | | | |
|---|---|---|---|
| 46-14851 | 4/1971 | Japan | 358/286 |
| 1231259 | 5/1971 | United Kingdom | 358/286 |

Primary Examiner—Raymond F. Cardillo, Jr.
Attorney, Agent, or Firm—Sughrue, Mion, Zinn, Macpeak & Seas

[57] ABSTRACT

A small, light-weight copying machine which is capable of being carried and which includes none of the bulky components ordinarily found in a copying machine. A light receiving element mounted upon a moving element is manually scanned over an original document. The light receiving element produces an image signal which in turn controls a thermal recording head which records upon a heat-sensitive recording sheet. The thermal recording head and light receiving element are both mounted upon a single moving element with the thermal recording head being stationarily mounted thereon and the light receiving element being movable therealong in a longitudinal scanning direction. The heat-sensitive recording sheet is moved in correspondence with lateral movement of the light receiving element.

7 Claims, 7 Drawing Figures

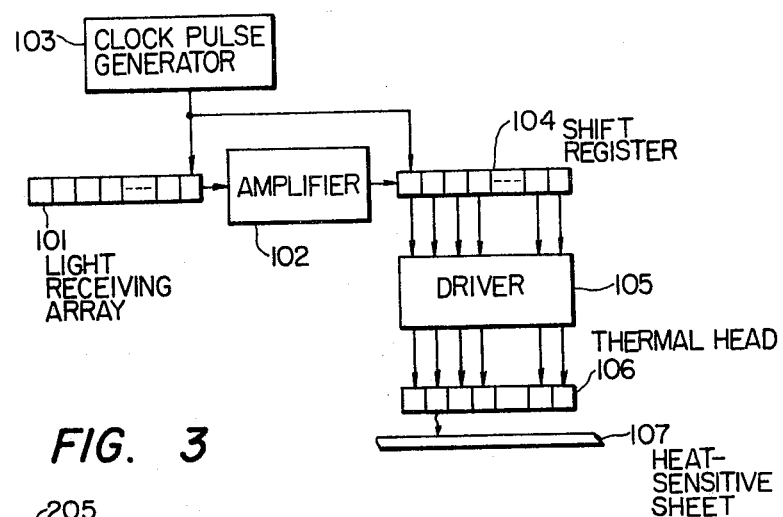
FIG. 1
FIG. 3
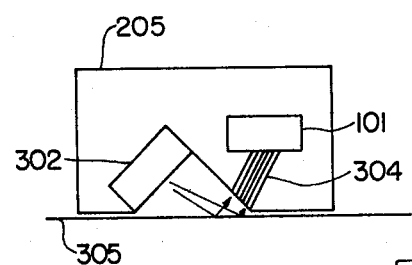
FIG. 4
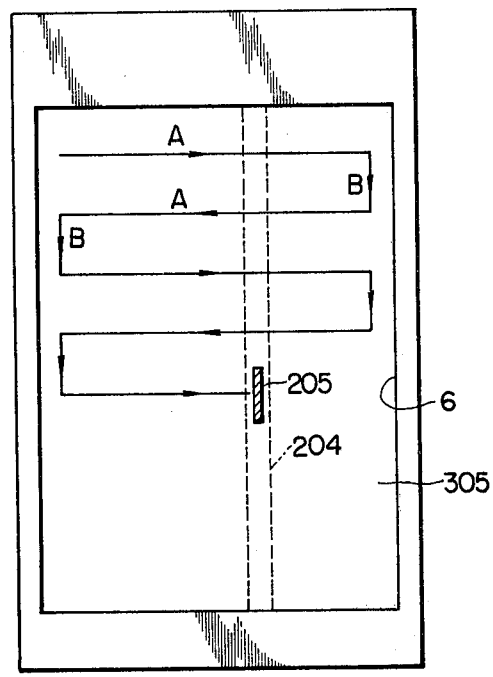

PORTABLE COPYING MACHINE

BACKGROUND OF THE INVENTION

The present invention relates to copying machines. More particularly, the invention relates to a copying machine whose size is sufficiently small that it is convenient to carry.

A conventional copying machine includes a number of fundamental components such as an illumination light source, an image forming optical system, a photosensitive element, a developing mechanism, a fixing mechanism, and a sheet feeding mechanism. Therefore, a conventional copying machine is necessarily intricate in construction and accordingly bulky.

Attempts at miniaturization and reduction in manufacturing cost of the conventional copying machine have been limited. In fact, it has been found impossible as a practical matter to reduce the size of a conventional copying machine to the extent that it is convenient to carry.

In view of the foregoing, an object of the present invention is to provide a copying machine in which the copying operation can be satisfactorily achieved without using fundamental components such as an image forming optical system, a photosensitive element, a developing mechanism and a fixing mechanism which are employed in a conventional copying machine and which is simple in construction and sufficiently small that it is convenient to carry.

SUMMARY OF THE INVENTION

In accordance with this and other objects of the invention, there is provided a copying machine including a thermal recording head for recording on a heat-sensitive sheet, a light receiving element for producing an image signal in response to scanning of an original document with the thermal recording head coupled to operate in response to the image signal so as to record data corresponding to the original document on the heat-sensitive sheet, a moving element with the light receiving element and thermal head being provided on the moving element with the moving element being movable in a main or lateral scanning direction, with the light receiving element being movable along the movable element in an auxiliary or longitudinal scanning direction and with the thermal head being stationarily mounted on the moving element, and a moving mechanism for moving the heat-sensitive sheet in correspondence with movement of the light receiving element.

BRIEF DESCRIPTION OF THE DRAWINGS

FIG. 1 is an explanatory diagram for a description of the principle of operation of a copying machine according to the invention;

FIG. 3 is an explanatory diagram showing a light receiving unit used with the embodiment of FIG. 2;

FIG. 4 is a diagram showing the locus of the light receiving unit;

DESCRIPTION OF THE PREFERRED EMBODIMENTS

Figure 2:
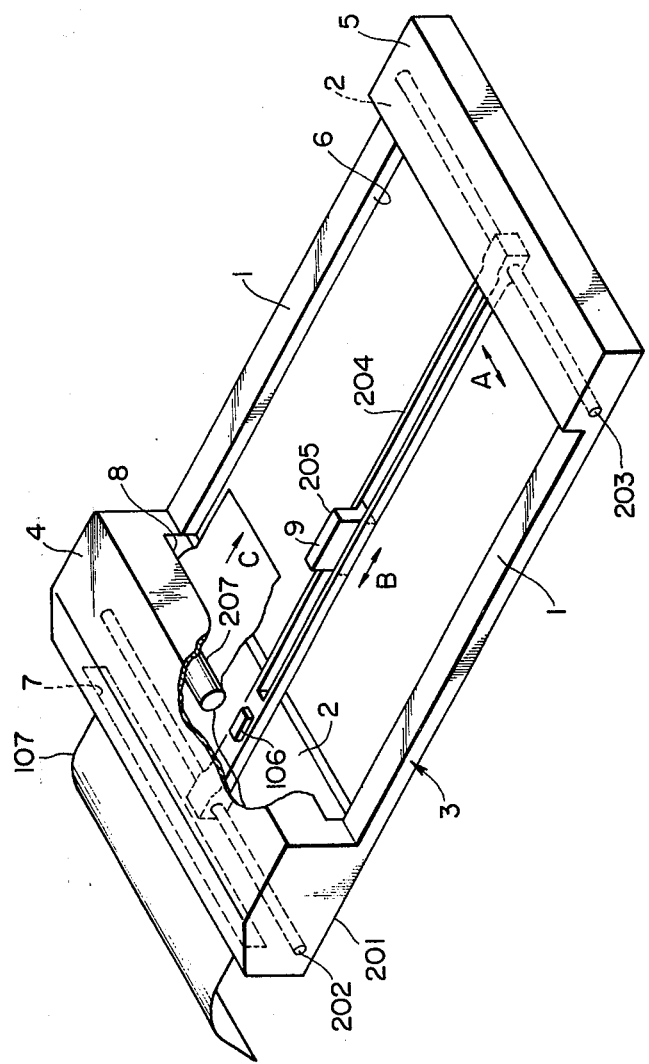
FIG. 2 is a perspective view showing the external appearance of a preferred embodiment of the copying machine according to the invention.

A preferred embodiment of the invention will be described with reference to the accompanying drawings.

FIG. 1 is an explanatory diagram for a description of the copying principle of a copying machine constructed according to the invention. The image of an original is converted into an electrical signal by a light receiving element array 101. The electrical signal is utilized to drive a thermal head 106 to record the image on a heat-sensitive sheet 107.

The size of each segment in the light receiving element array 101 corresponds to the reproducible resolution of the original's image. For instance, in the case where an original is read with a resolution of 10 lines/mm, the light receiving element segments are arranged at a pitch of 0.1 mm. The light receiving element array 101 is driven by a clock pulse generator 103 in response to which it outputs an image signal. The image signal is amplified and binary-coded by an amplifier 102 and is then applied to a shift register 104 which has plural stages the number of which is equal to the number of segments in the light receiving element array 101.

After data has been stored in all the stages of the shift register 104, a current signal produced in correspondence with the data in the shift register 104 is applied to the thermal head 106 by a driver 105 as a result of which the thermal head 106 generates heat to record the image on the heat-sensitive sheet 107. Thus, the number of dots in the thermal head 106 is made equal to the number of segments in the light receiving element array 101.

FIG. 2 is a partially cut-away perspective view showing the external appearance of the preferred embodiment of the copying machine according to the invention. A frame member 3 is constituted by a pair of supporting frames 1 and a pair of frames 2 which are provided at both ends of the pair of frames 1 in the longitudinal direction. A cover 4 and a cover 5 are provided on the frames 2 to form a casing 201. The pair of supporting frames 1 and the pair of supporting frames 2 form an opening 6 where an original document to be coupled is placed.

An inlet 7 and an outlet 8 for heat-sensitive sheets 107 are formed in both end faces of the cover 4, respectively. A pair of lateral guide rails 202 and 203 are provided parallel to each other in the covers 4 and 5, respectively. A longitudinal guide rail 204 is coupled to the lateral guide rails 202 and 203 in such a manner that it can slide laterally in the directions of the arrow A along the lateral guide rails 202 and 203.

A light receiving unit 205 is provided on the longitudinal guide rail 204 longitudinally slidable thereon in the direction of the arrow B. Furthermore, the thermal head 106 is fixedly secured to the longitudinal guide rail 204. A feed roller 207 is provided within the cover 2 to successively feed the heat-sensitive sheets 107 in the direction of the arrow C.

As shown in FIG. 3, a light emitting element 302 such as a light emitting diode is provided in the light receiving unit 205 so as to illuminate an original 305. Light reflected from the original is introduced through optical fibers 304 to the light receiving element array 101. A handle 9 is provided on the top of the light receiving unit 205 as shown in FIG. 2. The light receiving element 101 is made up of a one-dimensional solid image pick-up element array such as a photodiode array or a charge coupled device (CCD).

The operation of the copying machine will be described. The copying machine is placed over an original 305 and is positioned so that the opening 6 of the casing 201 is over a part of the original 305 to be copied. Under this condition, the light receiving unit 205 is moved to the stroke end laterally along the lateral guide rails 202 and 203 by manually moving the handle 9 of the light receiving unit 205.

As a result, data representing characters, etc. on the original 305 over a predetermined width results in an image signal from the light receiving element 101. With the image signal thus produced, the thermal head is driven in contact with the heat-sensitive sheet 107 with the aid of the feed roller 207. As a result, the data over the predetermined width is successively printed laterally on the heat-sensitive sheet 107.

Then, the light receiving unit 205 is manually moved longitudinally along the longitudinal guide rail 204 over a distance equal to the predetermined width by using the handle 9. In synchronization with this movement, the feed roller 207 is rotated to move the heat-sensitive sheet 107 by the same distance of movement as the light receiving unit 205. Thereafter, similar to the above-described operation, the light receiving unit 205 is moved laterally so that data over the following predetermined width is printed on the heat-sensitive sheet 107. That is, if the light receiving unit 205 is manually moved along a locus as shown in FIG. 4, then the entire data on the original 305 can be printed on the heat-sensitive sheet 107.

The copying machine according to the invention is constructed with fundamental components which include only the light receiving unit 205 with the light receiving element 101, the thermal head 106 driven by the image signal produced by the light receiving unit 205, and the feed roller 207 for feeding the heat-sensitive sheet 107. Unlike the conventional copying machine, the copying machine according to the invention has none of the fundamental components such as a photosensitive element, an image forming optical system, a developing mechanism and a fixing mechanism. Accordingly, the construction of the copying machine of the invention is very simple and small in size. Moreover, since the copying machine of the invention is so designed that the light receiving element 101 is moved both laterally and longitudinally along the surface of the original 305, the size of the light receiving element 101 can be reduced.

Figure 5:
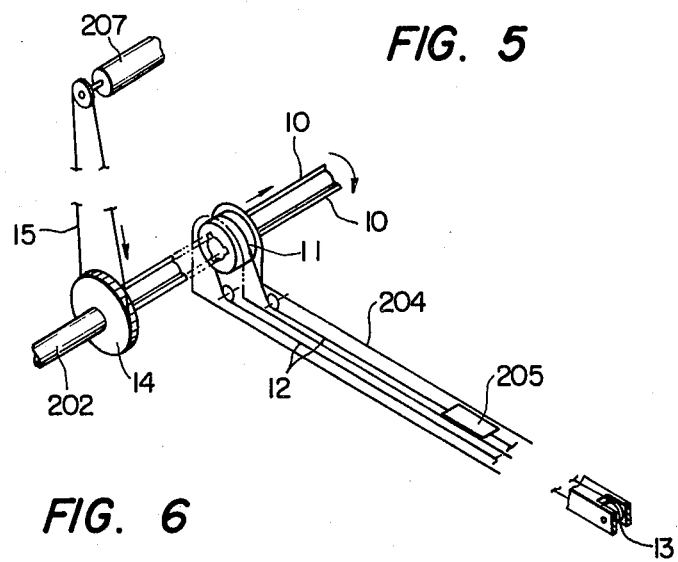
FIG. 5 is an explanatory diagram showing an interlocking mechanism for the light receiving unit and a feed roller.

An interlocking mechanism provided between the light receiving unit 205 and the feed roller 207 is shown in FIG. 5. The lateral guide rail 202 is rotatably supported. A plurality of protruding strips 10 are integrally formed on the surface of the guide rail 202 in such a manner that the strips 10 extend along the axis of the guide rail 202. A roller 11 is disposed over a segment of the protruding strips 10 in such a manner the roller 11 cannot turn around the protruding strip 10 but can slide therealong. Furthermore, the roller 11 is coupled to the longitudinal guide rail 204 in such a manner that it is rotatable with respect to the guide rail 204 but is fixed in position laterally and longitudinally with respect to the guide rail 204. A string member 12 extends around the roller 11. One end of the string member 12 is connected to the light receiving unit 205 and the other end is connected through a pulley 13 provided at one end of the longitudinal guide rail 204 to the light receiving unit 205. The lateral guide rail 202 is coupled through a pulley 14 and a belt 15 to the feed roller 207 so that the rotation of the guide rail 202 is transmitted to the feed roller 207.

With this construction, as the light receiving unit 205 is moved along the longitudinal guide rail 204, the roller 11 is rotated by the string member 12. The rotation of the roller 11 is transmitted through the protruding strips 10 to the lateral guide rail 202 to rotate the lateral guide rail 202. The rotation of the guide rail 202 is transmitted through the pulley 14 and the belt 15 to the feed roller 207 to rotate the feed roller 207. Thus, in synchronization with the movement of the light receiving unit 205 the feed roller 207 is driven to move the heat-sensitive sheet 107. When the longitudinal guide rail 204 is moved only laterally, the roller 11 is also moved only laterally along the lateral guide rail 202 and therefore the roller 11 does not turn.

Figure 6:
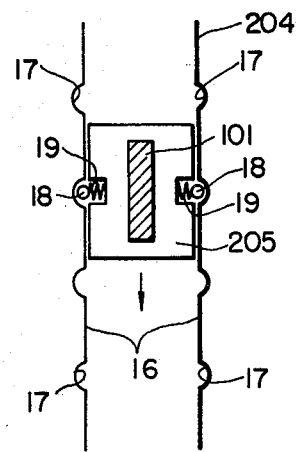
FIG. 6 is an explanatory diagram showing a positioning mechanism for the light receiving unit.

FIG. 6 shows a positioning mechanism used for controlling longitudinal movement of the light receiving unit 205. Positioning grooves 17 are formed in the guide surfaces 16 of the longitudinal guide rail 204 at predetermined intervals corresponding to the aforementioned data intervals. Balls 18 and springs 19 are provided in the light receiving unit 205. The balls 18 are pushed upon by the springs 19 so that the balls 18 are engaged with the positioning grooves 17. Thus, as the light receiving unit 205 is moved along the guide surfaces 16, the balls 18 are periodically engaged with the positioning grooves 17 and therefore the light receiving unit 205 is successively positioned.

Figure 7:
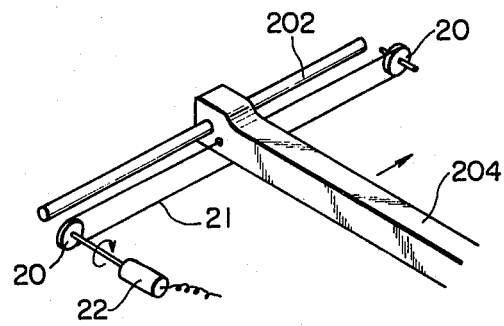
FIG. 7 is an explanatory diagram illustrating a synchronizing mechanism provided for the scanning of the light receiving unit and printing by a thermal head.

FIG. 7 shows a synchronizing mechanism for providing synchronization between the lateral scanning of the light receiving unit 205 and the printing of the thermal head 106. A pair of pulleys 20 are provided along the lateral guide rail 202 and a string member 21 disposed around the pulleys 20 is connected to the longitudinal guide rail 204 so that, as the guide rail 204 is moved laterally, the pulleys 20 are turned. One of the pulleys 20 is connected to turn a pulse encoder 22. Output pulses from the pulse encoder 22 are applied to the thermal head 106 to provide for synchronization.

With the synchronizing mechanism of the invention, even if the speed of movement of the light receiving unit becomes irregular when the light receiving unit is manually moved, the timing of printing is nevertheless synchronous with the scanning. A speed increasing mechanism may be provided between the pulley 20 and the pulse encoder 22 to prevent an excessive rate of rotation. Furthermore, the rotation can be made smooth by the provision of a flywheel.

In the above-described embodiment of a copying machine according to the invention, the light receiving unit 205 is moved manually. However, it may be moved mechanically if desired by an automatic mechanism.

As is apparent from the above description, the copying machine of the invention is quite simple in construction and therefore its size can be reduced to the extent that the copying machine is convenient to carry.

What is claimed is:

1. A copying machine comprising: a thermal recording head for recording on a heat-sensitive sheet; a light receiving element for producing an image signal in response to scanning a document, said thermal recording head operating in response to said image signal to record data corresponding to said original document on said heat-sensitive sheet; a moving element, means for moving said moving element in a main scanning direction, means for moving said light receiving element on said moving element in an auxiliary scanning direction, said thermal head being stationarily mounted on said moving element; and means for moving said heat-sensitive sheet in correspondence with movement of said light receiving element.

2. The copying machine of claim 1 wherein said light receiving element comprises an array of light receiving element segments.

3. The copying machine of claim 1 further comprising an amplifier coupled to receive said image signal produced by said light receiving element; means provided in said amplifier for converting said signal to digital form; a shift register device coupled to receive said signal of digital form; and a driver circuit coupled to outputs of said shifter register for driving said thermal head.

4. The copying machine of claim 1 wherein said moving element comprises first and second lateral guide rails; a longitudinal guide rail coupled to said lateral guide rails to slide laterally therealong, one of said lateral guide rails having strip portions on the periphery thereof; said means for moving said moving element comprising a pulley disposed to slide along said lateral guide rail having said strip portions and being rotatable with said lateral guide rail having said strip portions; said means for moving said light receiving element comprising a string member coupled to said light receiving element movable along said longitudinal guide rail and coupled to rotate said pulley as said light receiving element is moved along said longitudinal guide rail; and means for operating said means for moving said heat-sensitive sheet in response to rotation of said lateral guide rail having said strip portions.

5. The copying machine of claim 4 wherein said operating means comprises a second pulley coupled to rotate with said lateral guide rail having said strip portions and a string member coupled around said second pulley.

6. The copying machine of claim 5 wherein said longitudinal guide rail has a U-shaped portion along which said moving mechanism is slidably mounted.

7. The copying machine of claim 6 wherein said U-shaped portion of said longitudinal guide rail is provided with a plurality of positioning grooves for defining a scanning distance in the longitudinal direction and wherein said moving element comprises ball and spring members adapted to provide a detente function in cooperation with said positioning grooves.

* * * * *